United States Patent
Chang et al.

(10) Patent No.: US 10,223,594 B2
(45) Date of Patent: Mar. 5, 2019

(54) METHOD OF DETECTING WHETHER SURVEILLANCE CAMERA IS NORMAL OR ABNORMAL WITH ONE OF A PLURALITY OF ABNORMAL PROPERTIES

(71) Applicant: IRONYUN INC., Zhubei, Hsinchu County (TW)

(72) Inventors: Chu-Fei Chang, Zhubei (TW); Ning-Hsuan Chu, Zhubei (TW)

(73) Assignee: IRONYUN INC., Zhubei, Hsinchu County (TW)

( * ) Notice: Subject to any disclaimer, the term of this patent is extended or adjusted under 35 U.S.C. 154(b) by 181 days.

(21) Appl. No.: 15/370,157

(22) Filed: Dec. 6, 2016

(65) Prior Publication Data
US 2018/0114070 A1    Apr. 26, 2018

(30) Foreign Application Priority Data

Oct. 20, 2016    (TW) .............................. 105133928 A

(51) Int. Cl.
*G06K 9/00* (2006.01)
*G06T 7/00* (2017.01)

(52) U.S. Cl.
CPC ..... *G06K 9/00758* (2013.01); *G06K 9/00765* (2013.01); *G06K 9/00771* (2013.01);
(Continued)

(58) Field of Classification Search
CPC ....... H04N 21/4402; H04N 21/440272; H04N 21/44029; H04N 21/44204; H04N 21/44227; H04N 21/443; H04N 21/4621; H04N 21/4627; H04N 21/4788; H04N 21/4884; H04N 21/8355; H04N 21/8358; H04N 2201/0084; H04N 2201/0086;
(Continued)

(56) References Cited

U.S. PATENT DOCUMENTS

| 6,028,626 | A | 2/2000 | Aviv |
| 2012/0026326 | A1 * | 2/2012 | Itoh .................... G06K 9/00771 348/143 |

(Continued)

FOREIGN PATENT DOCUMENTS

| TW | 201415381 A | 4/2014 |
| TW | 201524188 A | 6/2015 |
| WO | WO-2006049350 A1 * | 5/2006 ............. G09G 3/006 |

*Primary Examiner* — Anand S Rao
*Assistant Examiner* — Samuel D Fereja
(74) *Attorney, Agent, or Firm* — Birch, Stewart, Kolasch & Birch, LLP

(57) ABSTRACT

A method of detecting whether a surveillance camera is abnormal or abnormal includes: obtaining a plurality of video frames from a video captured by the surveillance camera; sequentially comparing each of the plurality of video frames with a reference video frame; determining that the surveillance camera is abnormal when a sequence of video frame detection results indicates that not all of the plurality of video frames are normal video frames; issuing a maintenance notification of the surveillance camera when it is determined that the surveillance camera is abnormal with the particular one of the plurality of abnormal properties, thereby facilitating a maintenance procedure to be performed on the surveillance camera to remove the particular one of the plurality of abnormal properties.

16 Claims, 14 Drawing Sheets

(52) U.S. Cl.
CPC ............ *G06T 7/001* (2013.01); *G06T 7/0002* (2013.01); *G06T 2207/10016* (2013.01); *G06T 2207/10024* (2013.01); *G06T 2207/30168* (2013.01); *G06T 2207/30232* (2013.01)

(58) Field of Classification Search
CPC ... H04N 2201/0089; H04N 2201/3288; H04N 2201/3297; H04N 5/144; H04N 5/232; H04N 5/33; H04N 5/332; H04N 5/367; H04N 5/3675; H04N 5/445; H04N 5/782; H04N 5/913; H04N 5/92; H04N 5/926; H04N 5/9262; H04N 5/9268; H04N 5/945; H04N 7/002; H04N 7/01; H04N 7/08; H04N 7/088; H04N 7/0882; H04N 7/0884; H04N 7/0885; H04N 7/147; H04N 7/15; H04N 7/163; H04N 7/1675; H04N 7/173; H04N 7/22; H04N 7/54; H04N 9/7921; H04N 9/802
See application file for complete search history.

(56) References Cited

U.S. PATENT DOCUMENTS

2012/0163670 A1   6/2012  Eaton et al.
2013/0044964 A1*  2/2013  Ogura ................ G08B 29/046
                                              382/260

* cited by examiner

US 10,223,594 B2

METHOD OF DETECTING WHETHER SURVEILLANCE CAMERA IS NORMAL OR ABNORMAL WITH ONE OF A PLURALITY OF ABNORMAL PROPERTIES

BACKGROUND

1. Technical Field

The present disclosure relates generally to a method of detecting whether a surveillance camera is normal or abnormal, and more particularly to a method of detecting whether a surveillance camera is normal or abnormal with one of a plurality of abnormal properties.

2. Description of Related Art

Based on security and prevention of the life and property, the requirements of video surveillance apparatuses applied for monitoring traffic roads, managing shopping stores, and monitoring financial buildings are more and more diversified and growing. In general, the video surveillance apparatuses, such as surveillance cameras are installed in traffic intersections, within and/or outside shopping stores, and financial buildings in order to improve security and prevention of the life and property.

As problems of aging, abnormality, or intentional damages of the surveillance cameras, the images captured by the surveillance cameras cannot correctly and completely render real situations of traffic roads, shopping stores, and financial buildings. For example, the intentional damages are commonly blocked, sprayed, defocused, and redirected damages. Therefore, the surveillance cameras would not provide sufficient security and prevention of the life and property.

For the conventional surveillance cameras, operators or managers of the surveillance cameras usually determine videos or images captured by the surveillance cameras using their eyes to determine whether the surveillance cameras are good or not. Therefore, the maintenance duration of the surveillance camera would be delayed and the maintenance quality of the surveillance camera would be reduced because of inaccurate results of determining the videos or images captured by the surveillance cameras.

SUMMARY

An objective of the present disclosure is to provide a method of detecting whether a surveillance camera is normal or abnormal with one of a plurality of abnormal properties so as to accurately diagnose the specific abnormality of the of the surveillance cameras, avoid unnecessary delay of the maintenance process of the surveillance cameras, and effectively expedite the maintenance process of the surveillance cameras.

In order to achieve the above-mentioned objective, the method includes steps of:

obtaining a plurality of video frames from a video captured by the surveillance camera;

sequentially comparing each of the plurality of video frames with a reference video frame, thereby producing a sequence of video frame detection results, wherein each of video frame detection results indicates that a corresponding one of the plurality of video frames is a normal video frame or an abnormal video frame with one of a plurality of abnormal properties;

determining that the surveillance camera is normal when the sequence of video frame detection results indicates that all of the plurality of video frames are normal video frames; otherwise determining that the surveillance camera is abnormal when the sequence of video frame detection results indicates that not all of the plurality of video frames are normal video frames;

when it is determined that the surveillance camera is abnormal, determining that the surveillance camera is abnormal with a particular one of the plurality of abnormal properties based on a total number of abnormal video frames with each of the plurality of abnormal properties;

issuing a maintenance notification of the surveillance camera when it is determined that the surveillance camera is abnormal with the particular one of the plurality of abnormal properties, thereby facilitating a maintenance procedure to be performed on the surveillance camera to remove the particular one of the plurality of abnormal properties.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1:
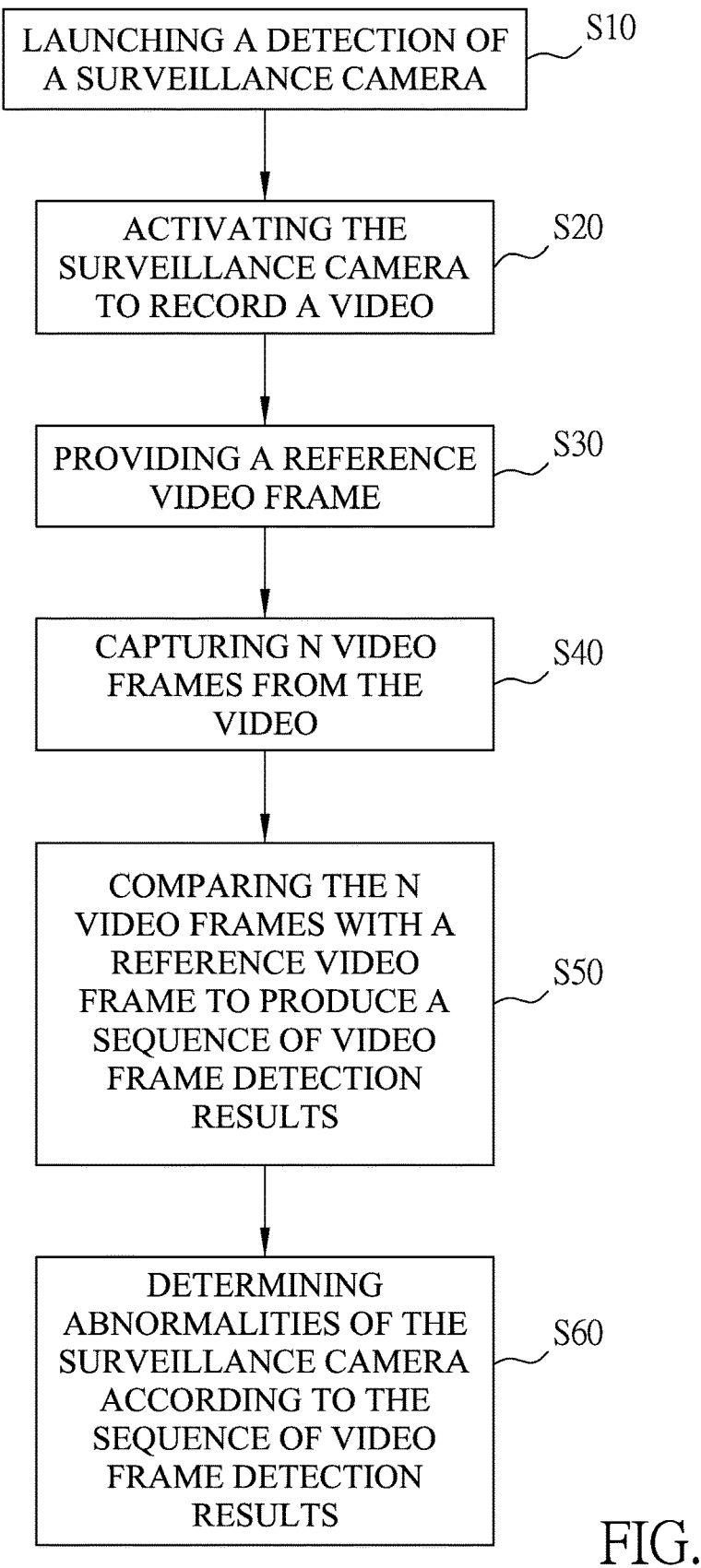
FIG. 1 is a flowchart of a method of detecting whether a surveillance camera is normal or abnormal according to an embodiment of the present disclosure.

Reference will now be made to the drawing figures to describe the present disclosure in detail.

FIG. 1 discloses a method of detecting whether a surveillance camera is normal or abnormal according to an embodiment of the present disclosure. First, a detection of the surveillance camera is launched (S10). In an embodiment, the surveillance camera is an outdoor surveillance camera. For example, the surveillance cameras could be, but not limited to, installed in traffic intersections, within and/or outside shopping stores, and financial buildings. It is to determine whether that the surveillance cameras are normal or abnormal by detecting videos captured from the surveillance cameras. When the abnormality of the surveillance camera is detected, it is further to determine the specific abnormalities according to specific abnormal properties, such as a blocked abnormality, a redirected abnormality, a sprayed abnormality, and a defocused abnormality, of the surveillance camera.

After the detection of the surveillance camera is launched, the surveillance camera is activated to record a video (S20). In other words, the surveillance camera is originally in a monitoring operation before the detection of the surveillance camera is launched. After the detection of the surveillance camera is launched, the surveillance camera records the video. For example, a length of the video may be minute-scale, such as one minute or two minutes.

Afterward, a reference video frame is provided (S30). The reference video frame, which provides comparison reference information, could be one or more than one selected from pre-stored video frames captured by the surveillance camera based on different times of the day and night, or different seasons of the year, such as summer or winter.

Figure 2:
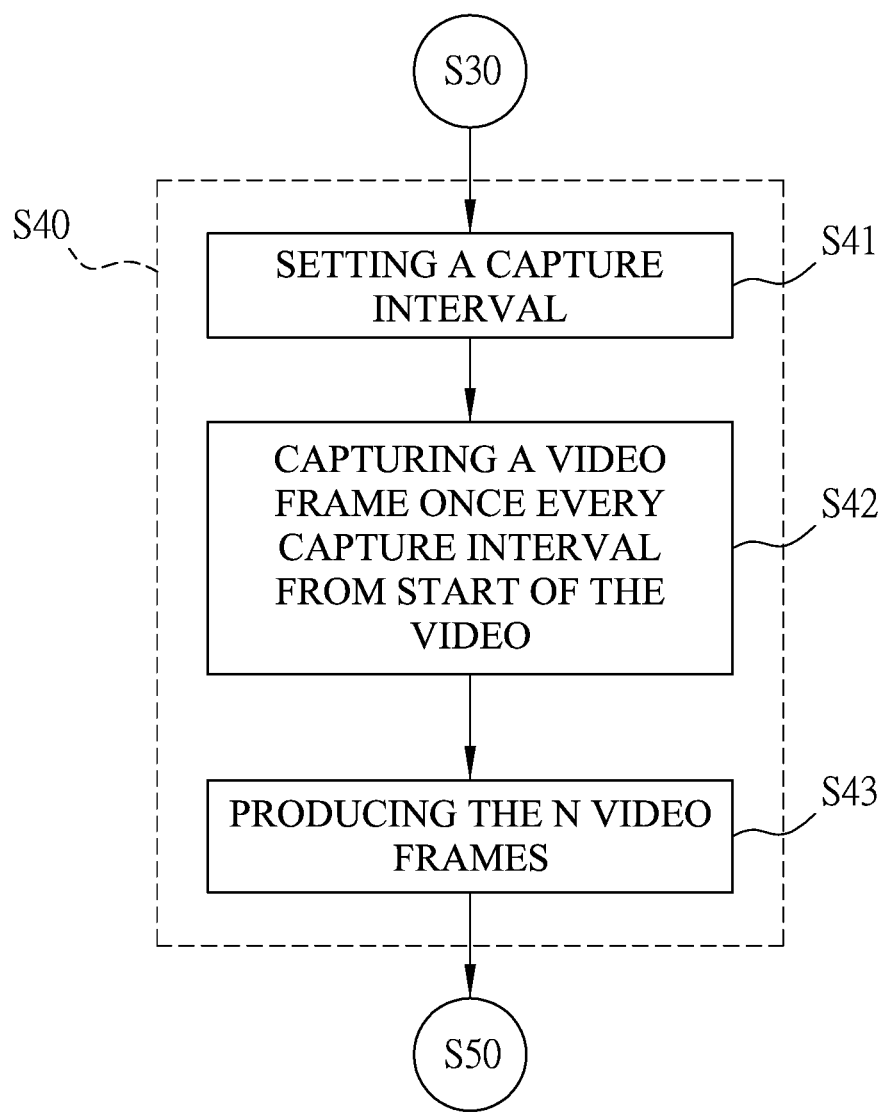
FIG. 2 is a flowchart of step S40 in the method of detecting abnormalities of the surveillance camera according to an embodiment of the present disclosure.

Afterward, a plurality of (e.g., N) video frames are captured from the video (S40), wherein N is a positive integer number greater than or equal to 2. In other words, the N still video frames are captured from the dynamic video in the step S40. The N video frames are arranged in a time sequence order of the video captured by the surveillance camera. Referring to FIG. 2, the step S40 includes steps S41 to S43. In the step S41, a capture interval is set. In particular, the capture interval may be set but not limited to 1/30 seconds. In other words, the N video frames are captured at a rate of 30 frames per second from the video.

Afterward, in the step S42, a video frame is captured once every capture interval from start of the video. For example, there are 1800 (N=1800) video frames produced when a video frame is captured once every 1/30 seconds from the one-minute video (S43). In addition, there are 1200 (N=1200) video frames produced when a video frame is captured once every 1/30 seconds from the one-minute video. The rest may be deduced by analogy, and the value of the N may be determined according to the length of the video and the capture interval.

Referring to FIG. 1 again, the N video frames are compared with the reference video frame to produce a sequence of video frame detection results (S50) after the step S40. Each of the video frame detection results indicates a corresponding one of the plurality of video frames is a normal video frame or an abnormal video frame with one of a plurality of abnormal properties.

Figure 3:
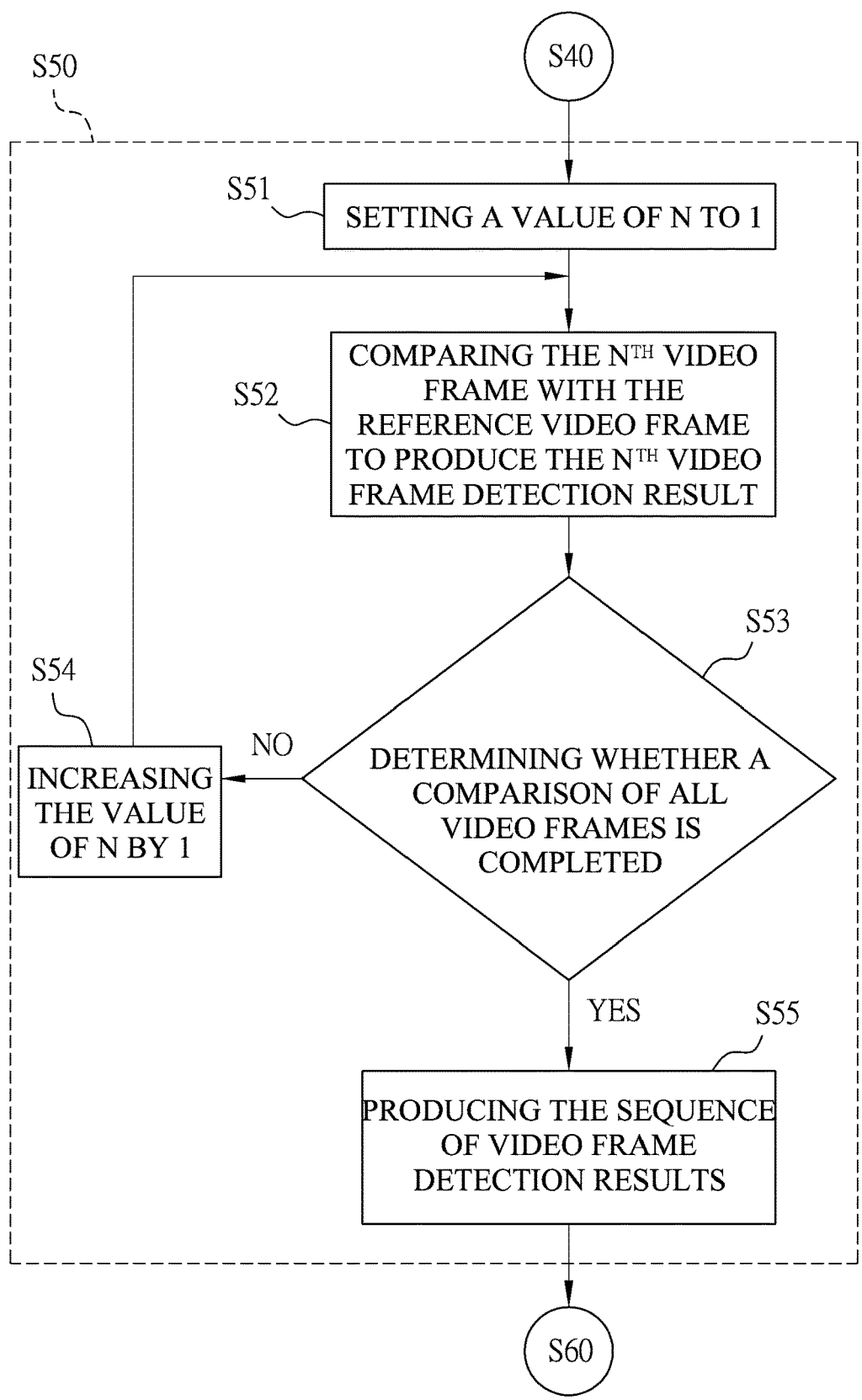
FIG. 3 is a flowchart of step S50 in the method of detecting abnormalities of the surveillance camera according to an embodiment of the present disclosure.

Referring to FIG. 3, the step S50 includes steps S51 to S55. In the step S51, the first (N=1) video frame is initially compared with the reference video frame. Afterward, the Nth video frame is compared with the reference video frame to produce the Nth video frame detection result in the step S52. In other words, the first (N=1) video frame is compared with the reference video frame to produce the first video frame detection result, the second (N=2) video frame is compared with the reference video frame to produce the second video frame detection result, and so on. The Nth video frame is compared with the reference video frame to produce the Nth video frame detection result (i.e., normal video frame, or an abnormal video frame with a particular one of the plurality of abnormal properties).

Afterward, it is to determine whether a comparison of all (N) video frames with the reference video frame is completed in the step S53. As exemplified by the video having 1800 video frames, if the comparison of the 1800 video frames with the reference video frame is not completed, a step S54 is executed. That is, the next video frame of Nth video frame, i.e., (N+1)th video frame is compared with the reference video frame. Until the comparison of all (N=1800) video frames with the reference video frame is completed, the step S55 is executed. That is, the sequence of video frame detection results with N normal and/or abnormal properties is produced. As exemplified by the 1800 video frames, the sequence of video frame detection results involves 1800 normal and/or abnormal properties, i.e., the sequence of video frame detection results={first normal/abnormal property, second normal/abnormal property, . . . , (N−1)th normal/abnormal property, Nth normal/abnormal property}.

Referring to FIG. 1 again, it is to determine abnormalities of the surveillance camera according to the sequence of video frame detection results of the video frames from the video (S60) after the step S50. In an embodiment, the abnormalities of the surveillance camera involve: a redirected abnormal property (redirected abnormality), a defocused abnormal property (defocused abnormality), a sprayed abnormal property (sprayed abnormality), and a blocked abnormal property (blocked abnormality). The redirected abnormality (RD) means that the surveillance camera is abnormally moved by an external force so as to redirect the surveillance camera and make the surveillance camera monitor undesired directions and views. The defocused abnormality (DF) means that the surveillance camera captures images that are not clear due to the inaccurate focal length of the surveillance camera. The sprayed abnormality (SR) means that the surveillance camera is vandalized with sprayed paint or other substances. The blocked abnormality (BK) means that the desired directions and views of the surveillance camera are blocked by non-transparent blocks.

After the step S60, a maintenance notification of the surveillance camera is issued when it is determined that the surveillance camera is abnormal with the particular one of the plurality of abnormal properties, thereby facilitating a maintenance procedure to be performed on the surveillance camera to remove the particular one of the plurality of abnormal properties.

As exemplified by the 1800 abnormal properties produced from the 1800 video frames, the abnormal properties are classified into one of the redirected abnormal property, the defocused abnormal property, the sprayed abnormal property, and the blocked abnormal property so to determine the abnormalities of the surveillance camera according to the 1800 abnormal properties.

In the above-mentioned example, one single video frame is compared with the reference video frame according to information of pixel, brightness, edge characteristics, position, angle, or so on so as to acquire the corresponding abnormal property. In one embodiment, the one single video frame could be segmented into a plurality of video frame segments; i.e., the corresponding one of the plurality of video frames may be segmented into a plurality of video frame segments. Also, the video frame segments are correspondingly compared with a plurality of video frame segments of the reference video frame to produce the sequence of video frame detection results with the corresponding normal and/or abnormal properties.

Figure 4A:
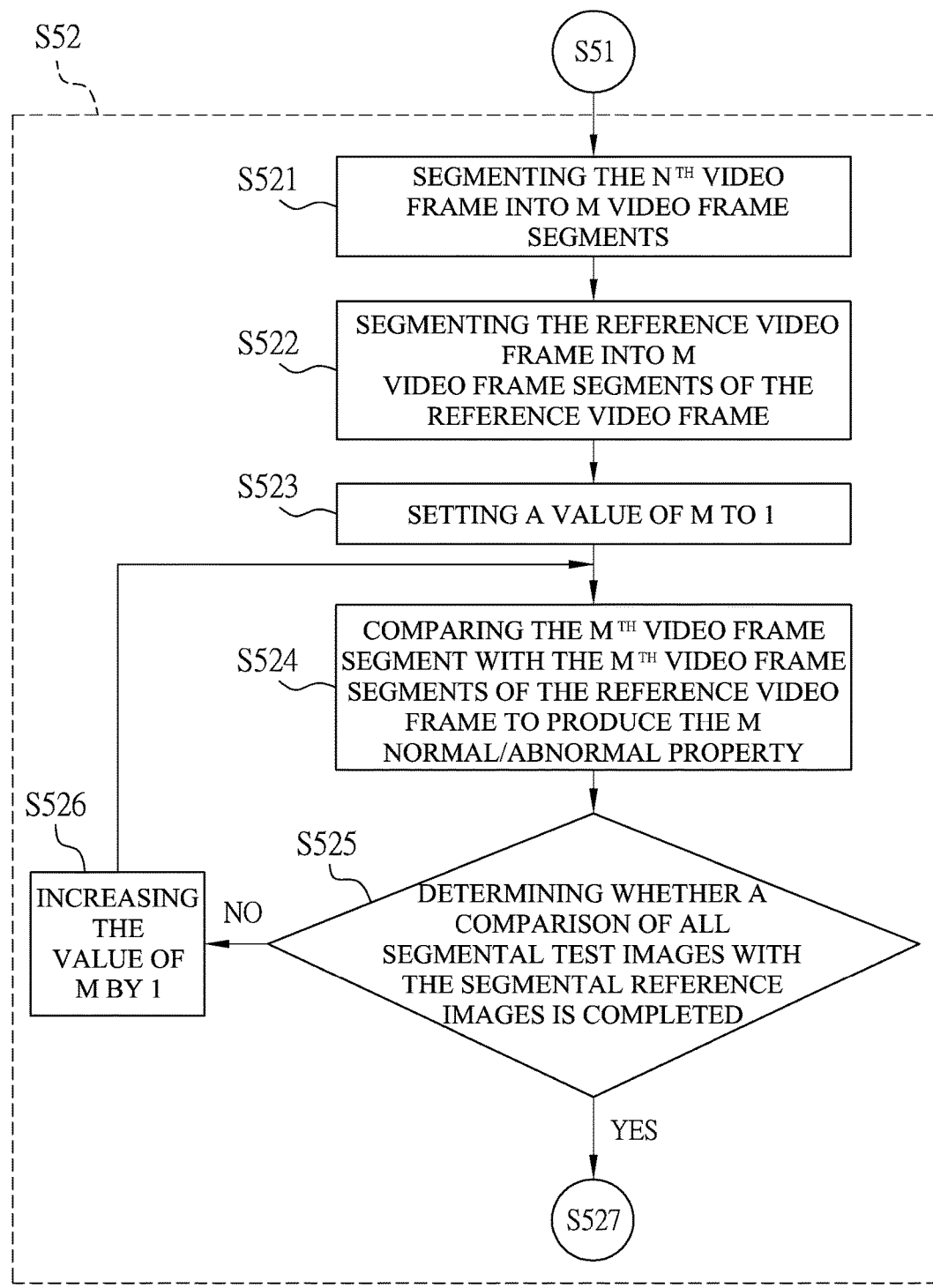
FIG. 4A and FIG. 4B are flowcharts of step S52 in the method of detecting abnormalities of the surveillance camera according to an embodiment of the present disclosure.
Figure 4B:
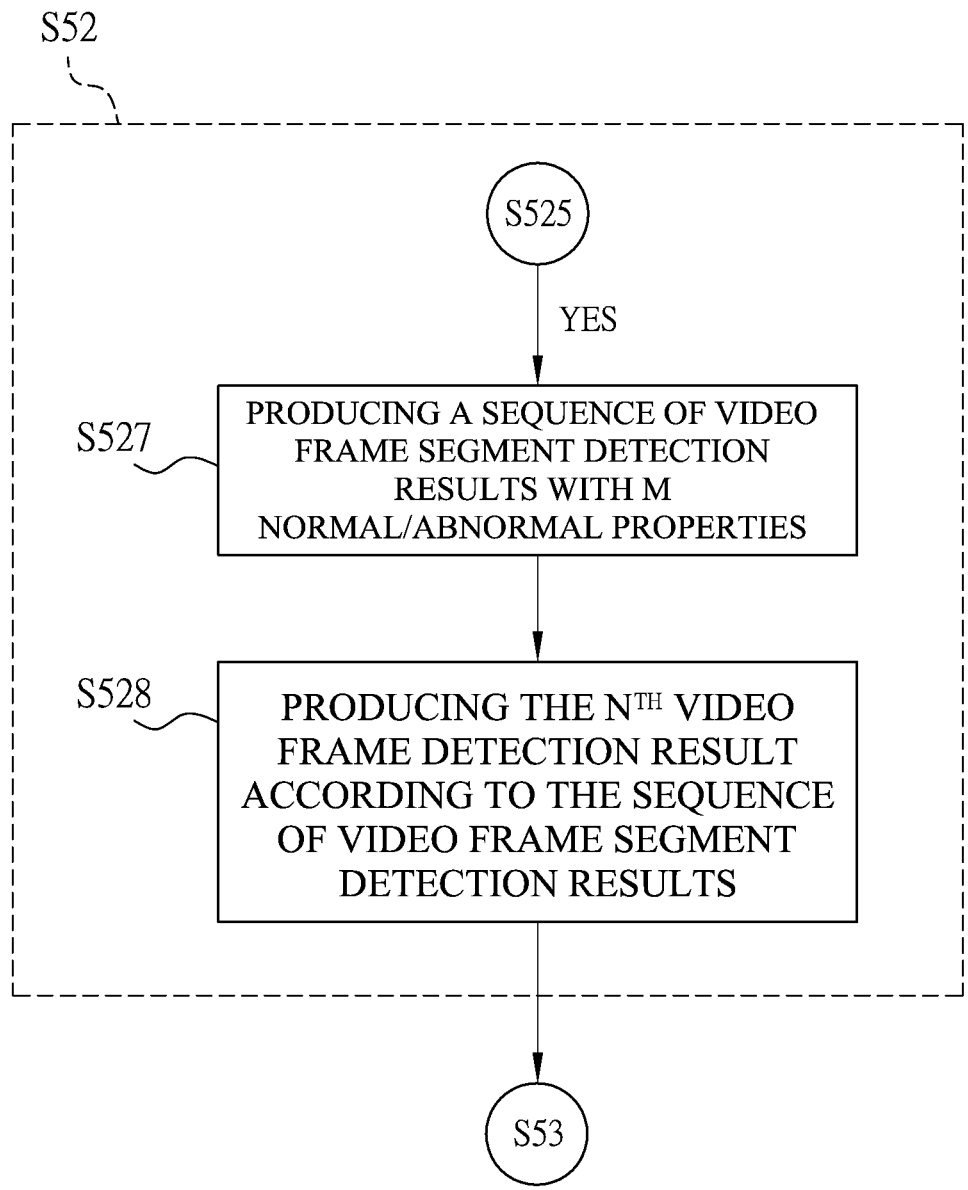

Referring to FIG. 4A and FIG. 4B, the step S52 includes steps S521 to S528. In the step S521, the Nth video frame is segmented into a plurality of (e.g., M) video frame segments arranged as an n-row and m-column matrix, i.e., M=n×m, wherein n and m are positive integers. Besides, the Nth video frame is also segmented into M video frame segments arranged as an n-row and n-column matrix, i.e., M=n×n. For example, the Nth video frame could be, but not limited to, segmented into 16 video frame segments arranged as a 4-row and 4-column matrix, or the Nth video frame could be segmented into 20 video frame segments arranged as a 5-row and 4-column matrix.

In order to correspondingly compare the M video frame segments of the video frame with the reference video frame, the reference video frame is also segmented into M video frame segments of the reference video frame (S522); i.e., the number and arrangement of the video frame segments of the video frame correspond to the number and arrangement of the video frame segments of the reference video frame. For example, the reference video frame is correspondingly segmented into 16 video frame segments of the reference video frame arranged as the 4-row and 4-column matrix when the Nth video frame is segmented into 16 video frame segments arranged as the 4-row and 4-column matrix. In an embodiment, the step S522 could be executed earlier than the step S521 when the number and arrangement of the M video frame segments are decided.

Afterward, the first (M=1) video frame segment of the Nth video frame is initially compared with the first video frame segment of the reference video frame in the step S523. Afterward, the Mth video frame segment is compared with the Mth video frame segment of the reference video frame to produce the Mth normal/abnormal property in the step S524. In other words, the first (M=1) video frame segment is compared with the first video frame segment of the reference video frame to produce the first video frame segment detection result (e.g., normal/abnormal property), the second (M=2) video frame segment is compared with the second video frame segment of the reference video frame to produce the second video frame segment detection result (e.g., normal/abnormal property), and so on. The Mth video frame segment is compared with the Mth video frame segment of the reference video frame to produce the Mth video frame segment detection result (e.g., normal/abnormal property).

Afterward, it is to determine whether a comparison of all (M) video frame segments of the Nth video frame with the video frame segments of the reference video frame is completed in the step S525. As exemplified by the 16 (M=16) video frame segments, if the comparison of 16 video frame segments with the video frame segments of the reference video frame is not completed, a step S526 is executed. That is, the next video frame segment of Mth video frame segment, i.e., (M+1)th video frame segment is correspondingly compared with the video frame segment of the reference video frame. Until the comparison of all (M=16) video frame segments with the video frame segments of the reference video frame is completed, a step S527 is executed. That is, a sequence of video frame segment detection results with M normal/abnormal properties is produced. As exemplified by the 16 video frame segments, the sequence of video frame segment detection results involves 16 normal/abnormal properties, i.e., the sequence of video frame segment detection results={first video frame segment with a normal/abnormal property, second video frame segment with a normal/abnormal property, . . . , (M−1)th video frame segment with a normal/abnormal property, Mth video frame segment with a normal/abnormal property}.

Afterward, it is to produce the Nth abnormal property according to the sequence of video frame segment detection results in the step S528, and then the step S53 shown in FIG. 3 is executed.

Figure 5:
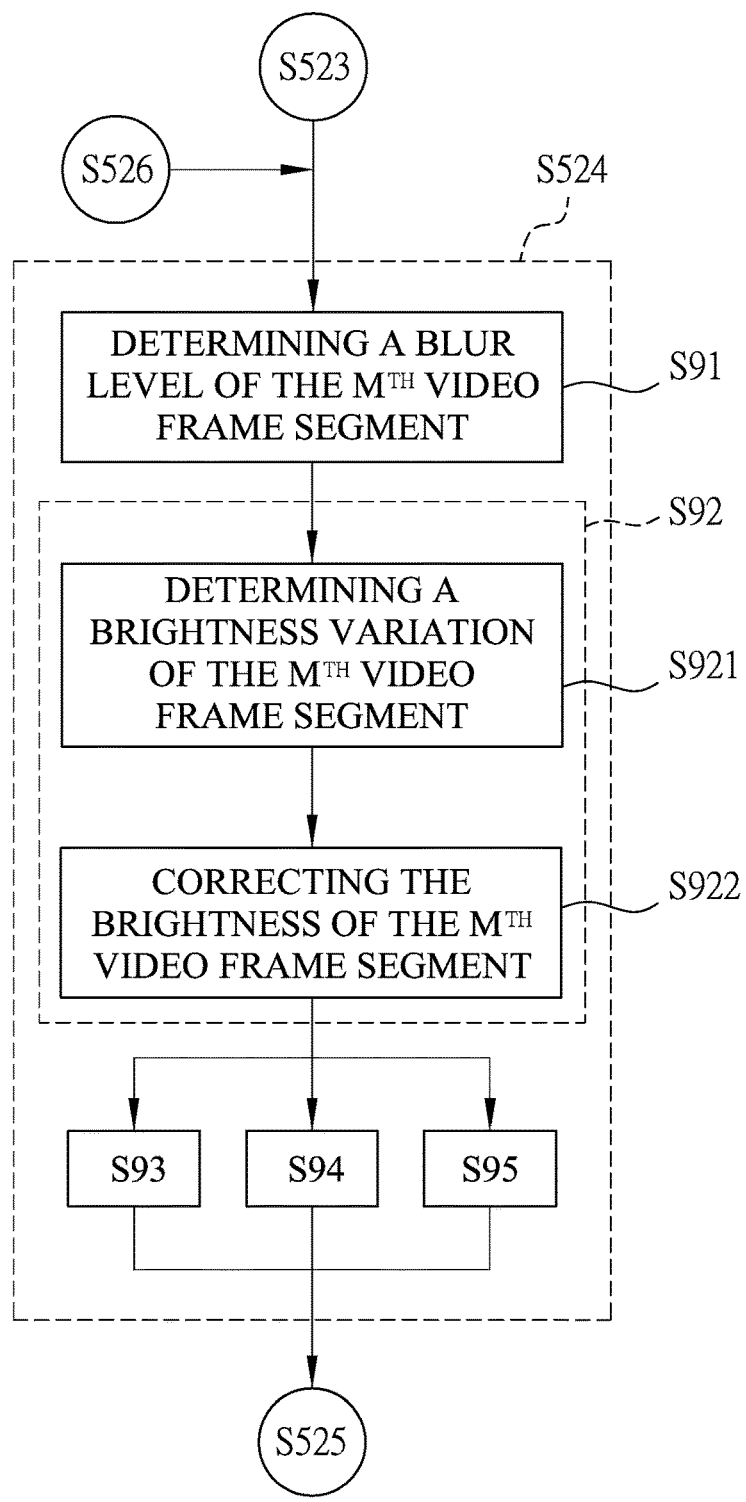
FIG. 5 is a flowchart of step S524 in the method of detecting abnormalities of the surveillance camera according to an embodiment of the present disclosure.
Figure 6:
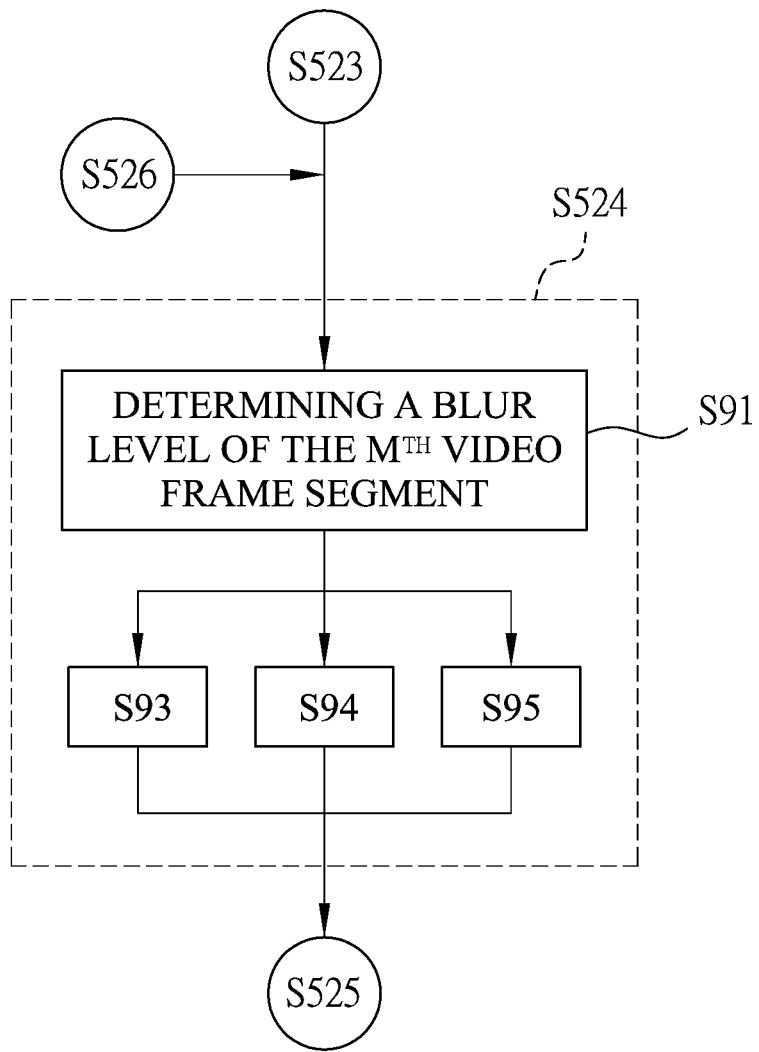
FIG. 6 is a flowchart of step S524 in the method of detecting abnormalities of the surveillance camera according to another embodiment of the present disclosure.

Referring to FIG. 5 and FIG. 6, the step S524 includes steps S91 to S95. As mentioned above, the step S524 is executed after the step S523 or the step S526. Referring to FIG. 5, the step S524 includes steps S91 to S95, and the step S92 includes steps S921 and S922. In addition, referring to FIG. 6, the step S524 includes steps S91, S93, S94, and S95. As exemplified in FIG. 5, the steps S91 and S92 are first described and then the steps S93 to S95 are described.

In order to compare the M video frame segments, it is to determine a blur level of the Mth video frame segment (S91). In the step S91, the blur level is classified into a low blur level, a medium blur level, and a high blur level. In an embodiment, the low blur level means that the Mth video frame segment is relatively clear, the high blur level means that Mth video frame segment is extremely blurred, and the medium blur level means that the Mth video frame segment is between the low blur level and the high blur level.

Afterward, in the step S92, it is to determine a brightness variation of the Mth video frame segment (S921). If necessary, the brightness of the Mth video frame segment is corrected (S922) so that the Mth video frame segment is appropriately compared with the reference video frame, thus increasing accuracy of the image comparison. After the step S91 and the step S92, the step S93, the step S94, or the step S95 is further executed.

As shown in FIG. 6, the step S92 involving the step S921 and the step S922 could be skipped if the brightness of the Mth video frame segment is appropriated for the reference video frame. Afterward, the step S93, the step S94, or the step S95 is executed according to the blur level of the Mth video frame segment in the step S91.

Figure 7:
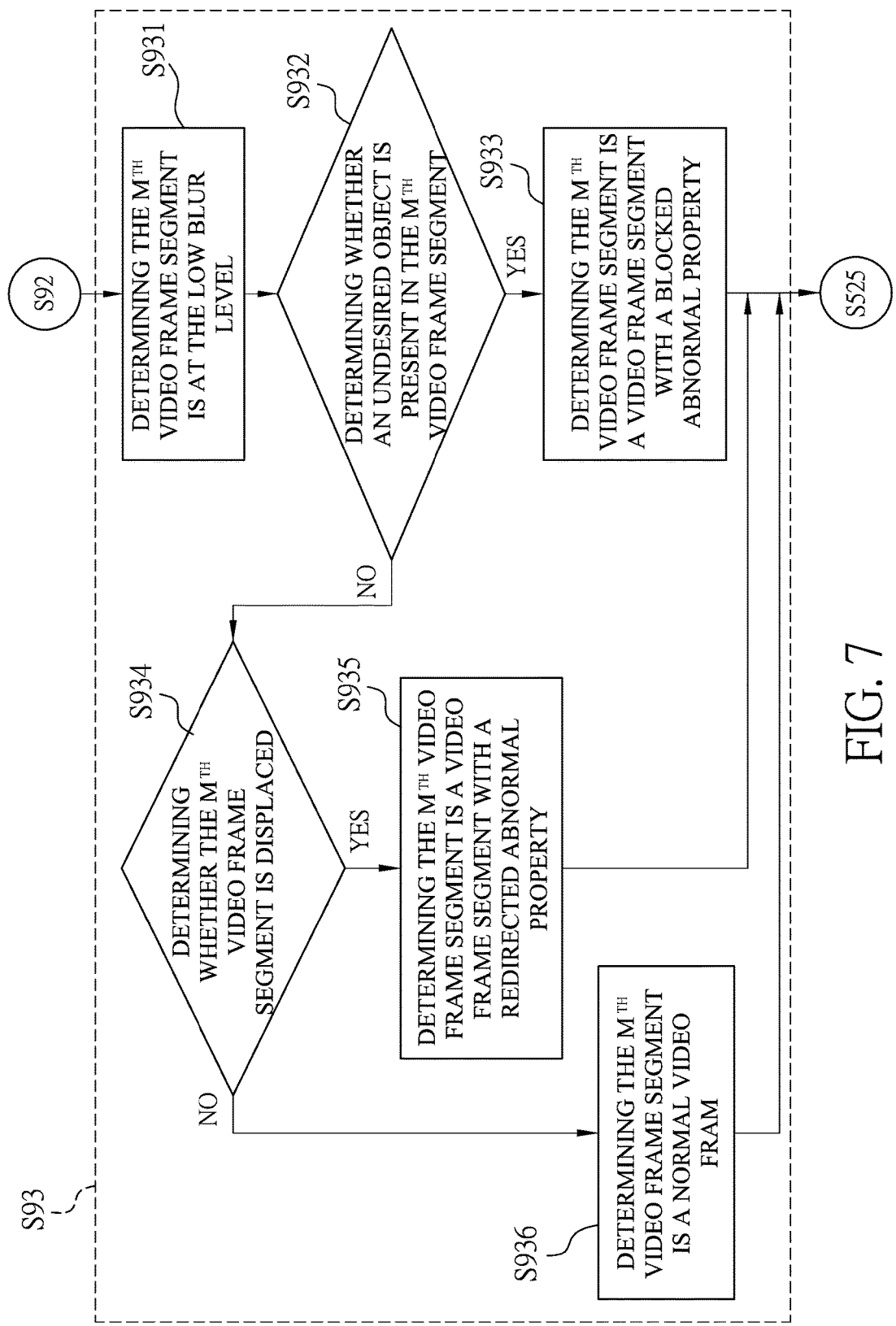
FIG. 7 is a flowchart of step S93 in the method of detecting abnormalities of the surveillance camera according to an embodiment of the present disclosure.

Referring to FIG. 7, it is to determine that the blur level of the Mth video frame segment is the low blur level (S931). In other words, the Mth video frame segment is relatively clear. After the blur level of the Mth video frame segment is determined to be the low blur level, it is further to correspondingly compare the Mth video frame segment with the Mth video frame segment of the reference video frame to determine whether an undesired object is present in the Mth video frame segment (S932). If the undesired object is present in the Mth video frame segment to cause abnormality of the surveillance camera since desired directions and views of the surveillance camera are blocked by the undesired object, it is to determine that the Mth video frame segment is the video frame segment with the blocked abnormal property (S933). After the step S933, the step S525 shown in FIG. 4A is executed.

It is to correspondingly compare the Mth video frame segment with the Mth video frame segment of the reference video frame to determine whether the Mth video frame segment is displaced (S934) if no undesired object is present in the Mth video frame segment in the step S932. If the Mth video frame segment is displaced to cause abnormality of the surveillance camera since the surveillance camera is abnormally moved to the undesired directions and views, it is to determine that the Mth video frame segment is the video frame segment with the redirected abnormal property (S935). After the step S935, the step S525 is executed.

It is to determine that the Mth video frame segment is the normal video frame segment (S936) if the Mth video frame segment is not displaced in the step S934. After the step S936, the step S525 is executed.

In summary,

1. If the Mth video frame segment is at the low blur level and the undesired object is present in the Mth video frame segment, it is to determine that the Mth video frame segment is the video frame segment with the blocked abnormal property;

2. If the Mth video frame segment is at the low blur level, no undesired object is present in the Mth video frame segment, and the Mth video frame segment is displaced, it is to determine that the Mth video frame segment is the video frame segment with the redirected abnormal property; and 3. If the Mth video frame segment is at the low blur level, no undesired object is present in the Mth video frame segment, and the Mth video frame segment is not displaced, it is to determine that the Mth video frame segment is the normal video frame segment. In an embodiment, the number of the normal video frame segments may be ignored or be considered for lower weighting factor so as to hardly dominate the abnormality results of the comparison, thus truly determining degrees and statuses of the abnormalities of the Nth abnormal property.

Figure 8:
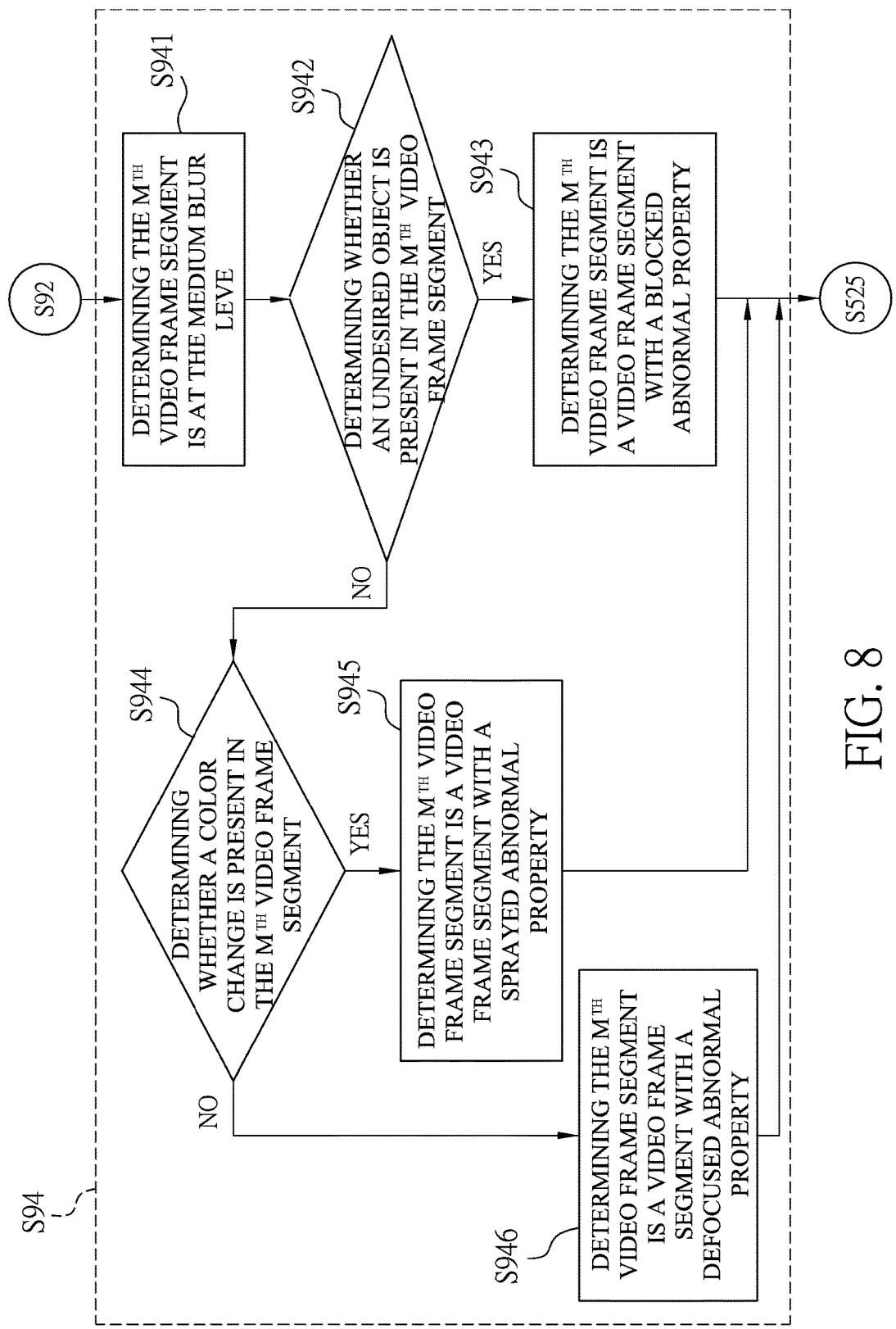
FIG. 8 is a flowchart of step S94 in the method of detecting abnormalities of the surveillance camera according to an embodiment of the present disclosure.

Referring to FIG. 8, it is to determine that the blur level of the Mth video frame segment is the medium blur level (S941). After the blur level of the Mth video frame segment is determined to be the medium blur level, it is further to correspondingly compare the Mth video frame segment with the Mth video frame segment of the reference video frame to determine whether an undesired object is present in the Mth video frame segment (S942). If the undesired object is present in the Mth video frame segment to cause abnormality of the surveillance camera since desired directions and views of the surveillance camera is blocked by the undesired object, it is to determine that the Mth video frame segment is the video frame segment with the blocked abnormal property (S943). After the step S943, the step S525 shown in FIG. 4A is executed.

It is to correspondingly compare the Mth video frame segment with the Mth video frame segment of the reference video frame to determine whether a color change is present in the Mth video frame segment (S944) if no undesired object is present in the Mth video frame segment in the step S942. If the color change is present in the Mth video frame segment to cause abnormality of the surveillance camera since the surveillance camera is vandalized with sprayed paint or other substances, it is to determine that the Mth video frame segment is the video frame segment with the sprayed abnormal property (S945). After the step S945, the step S525 is executed.

It is to determine that the Mth video frame segment is the video frame segment with the defocused abnormal property (S946) if no color change is present in the Mth video frame segment in the step S944. After the step S946, the step S525 is executed.

In summary,

1. If the Mth video frame segment is at the medium blur level and the undesired object is present in the Mth video frame segment, it is to determine that the Mth video frame segment is the video frame segment with the blocked abnormal property;

2. If the Mth video frame segment is at the medium blur level, no object is present in the Mth video frame segment, and the color change is present in the Mth video frame segment, it is to determine that the Mth video frame segment is the video frame segment with the sprayed abnormal property; and 3. If the Mth video frame segment is at the medium blur level, no undesired object is present in the Mth video frame segment, and no color change is present in the Mth video frame segment, it is to determine that the Mth video frame segment is the video frame segment with the defocused abnormal property. In an embodiment, the number of the normal segmental images may be ignored or be considered for lower weighting factor so as to hardly dominate the abnormality results of the comparison, thus truly determining degrees and statuses of the abnormalities of the Nth abnormal property.

Figure 9:
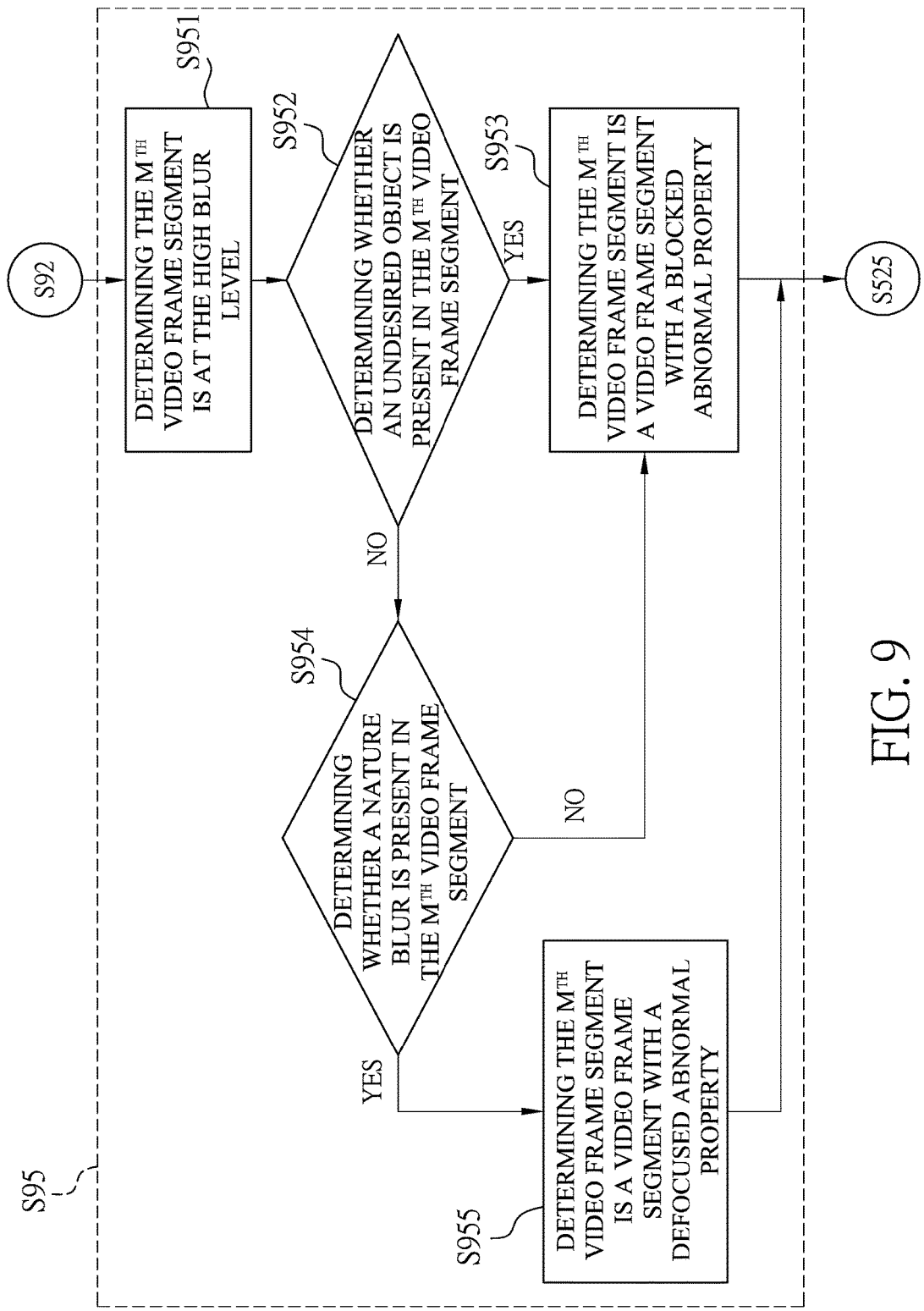
FIG. 9 is a flowchart of step S95 in the method of detecting abnormalities of the surveillance camera according to an embodiment of the present disclosure.

Referring to FIG. 9, it is to determine that the blur level of the Mth video frame segment is the high blur level (S951). In other words, the Mth video frame segment is extremely blurred. After the blur level of the Mth video frame segment is determined to be the high blur level, it is further to correspondingly compare the Mth video frame segment with the Mth video frame segment of the reference video frame to determine whether an undesired object is present in the Mth video frame segment (S952). If the undesired object is present in the Mth video frame segment to cause abnormality of the surveillance camera since desired directions and views of the surveillance camera is blocked by the undesired object, it is to determine that the Mth video frame segment is the video frame segment with the blocked abnormal property (S953). After the step S953, the step S525 shown in FIG. 4A is executed.

It is to correspondingly compare the Mth video frame segment with the Mth video frame segment of the reference video frame to determine whether a nature blur is present in the Mth video frame segment (S954) if no undesired object is present in the Mth video frame segment in the step S952. If the nature blur is present in the Mth video frame segment to cause abnormality of the surveillance camera since the inaccurate focal length of the surveillance camera, it is to determine that the Mth video frame segment is the video frame segment with the defocused abnormal property (S955). After the step S955, the step S525 is executed.

It is to determine that the Mth video frame segment is the video frame segment with the blocked abnormal property (S953) if no nature blur is present in the Mth video frame segment in the step S954. After the step S953, the step S525 is executed.

In summary,

1. If the Mth video frame segment is at the high blur level and the undesired object is present in the Mth video frame segment, it is to determine that the Mth video frame segment is the video frame segment with the blocked abnormal property;

2. If the Mth video frame segment is at the high blur level, no object is present in the Mth video frame segment, and no nature blur is present in the Mth video frame segment, it is to determine that the Mth video frame segment is the video frame segment with the blocked abnormal property; and 3. If the Mth video frame segment is at the high blur level, no undesired object is present in the Mth video frame segment, and the nature blur is present in the Mth video frame segment, it is to determine that the Mth video frame segment is the video frame segment with the defocused abnormal property. In an embodiment, the number of the normal segmental images may be ignored or be considered for lower weighting factor so as to hardly dominate the abnormality results of the comparison, thus truly determining degrees and statuses of the abnormalities of the Nth abnormal property.

A sprayed abnormality of the surveillance camera is exemplified for further demonstration as follows.

Figure 10A:
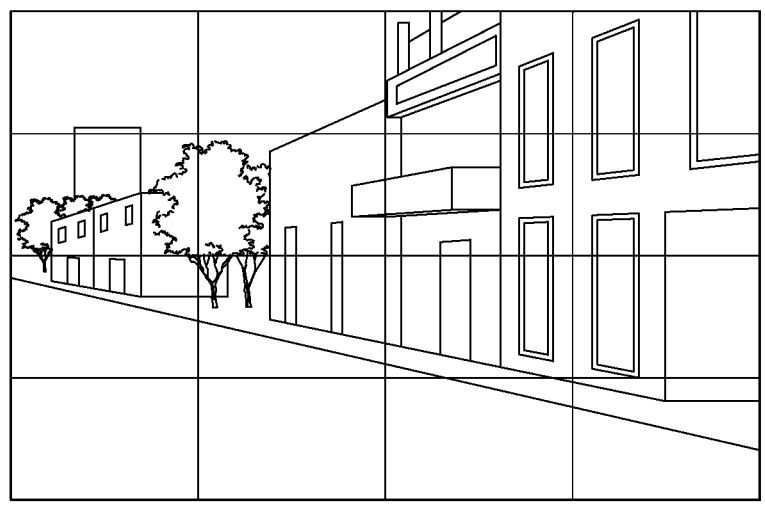
FIG. 10A is a schematic view of a reference video frame according to an embodiment of the present disclosure.
Figure 10B:
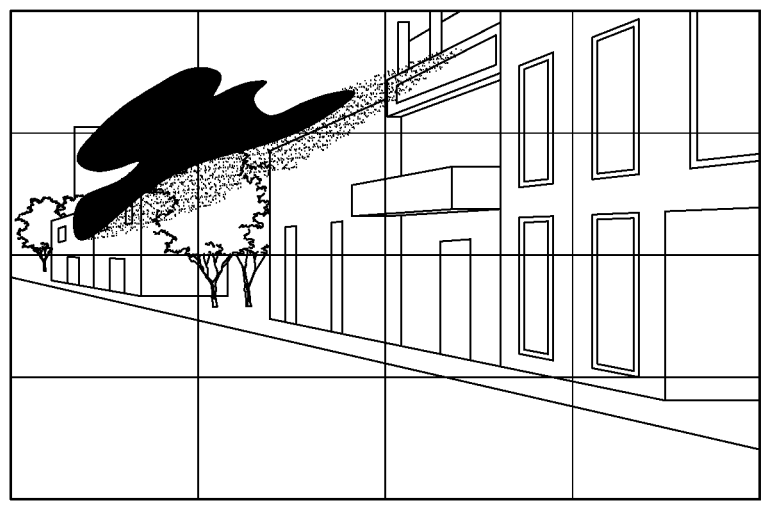
FIG. 10B is a schematic view of a video frame with abnormal properties according to an embodiment of the present disclosure.
Figure 10C:
FIG. 10C is a schematic view of the video frame with abnormal properties according to another embodiment of the present disclosure.
Figure 10D:
FIG. 10D is a schematic view of the video frame with abnormal properties according to still another embodiment of the present disclosure.

Referring to FIG. 10A to FIG. 10D, the above-mentioned reference video frame is shown in FIG. 10A. As exemplified by the one-minute video having 1800 video frames, it is assumed that the 700th (N=700) video frame is shown in FIG. 10B, the 760th (N=760) video frame is shown in FIG. 10C, and the 820th (N=820) video frame is shown in FIG. 10D. In addition, the video frames shown in FIG. 10B to FIG. 10D are segmented into 16 (M=16) video frame segments arranged as a 4-row and 4-column matrix (S521). Also, the reference video frame shown in FIG. 10A is correspondingly segmented into 16 (M=16) video frame segments of the reference video frame arranged as a 4-row and 4-column matrix (S522). Afterward, all video frame segments are compared with the corresponding video frame segments of the reference video frame from the first (M=1) video frame segment (S523) to the last (M=16) video frame segment (S524-S526). As exemplified by the video frame shown in the FIG. 10B, the 16 video frame segments of the 700th video frame are compared with the reference video frame. As exemplified by the video frame shown in the FIG. 10C, the 16 video frame segments of the 760th video frame are compared with the reference video frame. Also, as exemplified by the video frame shown in the FIG. 10D, the 16 video frame segments of the 820th video frame are compared with the reference video frame.

For convenient and clear descriptions, the sequence of the video frame segments is defined from left to right and top to bottom as follows. The first (M=1) video frame segment is the upper-left video frame segment, the fourth (M=4) video frame segment is the upper-right video frame segment, the thirteenth (M=13) video frame segment is the lower-left video frame segment, and the last (M=16) video frame segment is the lower-right video frame segment.

The following Table 1 discloses related steps of the comparison of the 16 video frame segments of the 700th video frame.

TABLE 1

| sequence number of video frame segments | related steps | results of comparison |
|---|---|---|
| M = 1 | S941→S942→S943 | BK |
| M = 2 | S951→S952→S953 | BK |
| M = 3 | S931→S932→S934→S936 | NM |
| M = 4 | S931→S932→S934→S936 | NM |
| M = 5 | S951→S952→S953 | BK |
| M = 6 | S941→S942→S944→S945 | SR |
| M = 7 | S931→S932→S934→S936 | NM |
| M = 8 | S931→S932→S934→S936 | NM |
| M = 9 | S931→S932→S934→S936 | NM |
| M = 10 | S931→S932→S934→S936 | NM |
| M = 11 | S931→S932→S934→S936 | NM |
| M = 12 | S931→S932→S934→S936 | NM |
| M = 13 | S931→S932→S934→S936 | NM |
| M = 14 | S931→S932→S934→S936 | NM |
| M = 15 | S931→S932→S934→S936 | NM |
| M = 16 | S931→S932→S934→S936 | NM |

In Table 1, BK represents the video frame segment with the blocked abnormal property, SR represents the video frame segment with the sprayed abnormal property, and NM represents the normal video frame segment.

As shown in FIG. 10B, the sequence of video frame segment detection results of the 700th video frame is produced in the step S527 as follows: the sequence of video frame segment detection results={BK, BK, NM, NM, BK, SR, NM, NM, NM, NM, NM, NM, NM, NM, NM, NM}. According to the sequence of video frame segment detection results, the total number of the video frame segment with the blocked abnormal property (BK) is three, the total number of the video frame segment with the sprayed abnormal property (SR) is one, and the total number of the normal video frame segment is 12. In an embodiment, it is to determine that the surveillance camera is normal only if the sequence of video frame detection results indicates that all of the plurality of video frames are normal video frames (NMs). In other words, it is to determine that the surveillance camera is abnormal as long as the sequence of video frame detection results indicates that not all of the plurality of video frames are normal video frames, i.e., at least one video frame segment is the video frame segment with one of the abnormal properties, including the blocked abnormal property, the sprayed abnormal property, the defocused abnormal property, and the redirected abnormal property. In an embodiment, the particular one of the abnormal properties is determined based on the total number of abnormal video frame segments with each of the plurality of abnormal properties. In an embodiment, the particular one of the abnormal properties is determined if the total number of abnormal video frame segments with the particular one of the plurality of abnormal properties is more than a total number of abnormal video frame segments with any other one of the plurality of abnormal properties. Accordingly, it is to determine that the 700th video frame property is the blocked abnormal property in the step S528 since the total number of the video frame segment with the blocked abnormal property (BK) is greater than the total number of the video frame segment with the sprayed abnormal property (SR) according to the sequence of video frame segment detection results of the 700th video frame.

In one embodiment, the abnormal property of the video frame is determined according to a maximum number of consecutive abnormal video frame segments with abnormal property if the total number (>0) of any two abnormal properties is the identical. For example, both the total numbers, which is equal to three, of the video frame segment with the blocked abnormal property (BK) and the maximum number of the video frame segment with the sprayed abnormal property (SR) are the identical if the sequence of video frame segment detection results={BK, BK, NM, NM, BK, SR, NM, NM, SR, NM, NM, NM, SR, NM, NM, NM}. Since the maximum number of consecutive abnormal video frame segments, which is equal to two, with the BK is greater than the maximum number of consecutive abnormal video frame segments, which is equal to one, with the SR, it is to determine that the exemplified video frame property is the blocked abnormal property (BK). For another example, both the total numbers, which is equal to six, of the video frame segment with the blocked abnormal property (BK) and the maximum number of the video frame segment with the sprayed abnormal property (SR) are identical if the sequence of video frame segment detection results={NM, SR, BK, BK, SR, SR, SR, SR, BK, BK, NM, NM, BK, BK, SR, NM}. Since the maximum number of consecutive abnormal video frame segments, which is equal to four, with the SR is greater than the maximum number of consecutive abnormal video frame segments, which is equal to two, with the BK, it is to determine that the exemplified video frame property is the sprayed abnormal property (SR).

The following Table 2 discloses related steps of the comparison of the 16 video frame segments of the 760th video frame.

TABLE 2

| sequence number of video frame segments | related steps | results of comparison |
|---|---|---|
| M = 1 | S941→S942→S943 | BK |
| M = 2 | S951→S952→S953 | BK |
| M = 3 | S941→S942→S944→S945 | SR |
| M = 4 | S941→S942→S944→S945 | SR |
| M = 5 | S951→S952→S953 | BK |
| M = 6 | S941→S942→S944→S945 | SR |
| M = 7 | S941→S942→S944→S945 | SR |
| M = 8 | S931→S932→S934→S936 | NM |
| M = 9 | S941→S942→S944→S945 | SR |
| M = 10 | S941→S942→S944→S945 | SR |
| M = 11 | S931→S932→S934→S936 | NM |
| M = 12 | S931→S932→S934→S936 | NM |
| M = 13 | S941→S942→S944→S945 | SR |
| M = 14 | S931→S932→S934→S936 | NM |
| M = 15 | S931→S932→S934→S936 | NM |
| M = 16 | S931→S932→S934→S936 | NM |

In Table 2, BK represents the video frame segment with the blocked abnormal property, SR represents the video frame segment with the sprayed abnormal property, and NM represents the normal video frame segment.

As shown in FIG. 10C, the sequence of video frame segment detection results of the 760th video frame is produced in the step S527 as follows: the sequence of video frame segment detection results={BK, BK, SR, SR, BK, SR, SR, NM, SR, SR, NM, NM, SR, NM, NM, NM}. According to the sequence of video frame segment detection results, the total number of the video frame segment with the blocked abnormal property (BK) is three, the total number of the video frame segment with the sprayed abnormal property (SR) is seven, and the total number of the normal video frame segment is six. Accordingly, it is to determine that the 760th video frame property is the sprayed abnormal property in the step S528 since the total number of the video frame segment with the sprayed abnormal property (SR) is greater than the total number of the video frame segment with the blocked abnormal property (BK) according to the sequence of video frame segment detection results of the 760th video frame.

The following Table 3 discloses related steps of the comparison of the 16 video frame segments of the 820th video frame.

TABLE 3

| sequence number of video frame segments | related steps | results of comparison |
|---|---|---|
| M = 1 | S941→S942→S943 | BK |
| M = 2 | S951→S952→S953 | BK |
| M = 3 | S941→S942→S944→S945 | SR |
| M = 4 | S941→S942→S944→S945 | SR |
| M = 5 | S951→S952→S953 | BK |
| M = 6 | S941→S942→S944→S945 | SR |
| M = 7 | S941→S942→S944→S945 | SR |
| M = 8 | S941→S942→S944→S945 | SR |
| M = 9 | S941→S942→S944→S945 | SR |
| M = 10 | S941→S942→S944→S945 | SR |
| M = 11 | S941→S942→S944→S945 | SR |
| M = 12 | S941→S942→S944→S945 | SR |
| M = 13 | S941→S942→S944→S945 | SR |
| M = 14 | S941→S942→S944→S945 | SR |
| M = 15 | S931→S932→S934→S936 | NM |
| M = 16 | S931→S932→S934→S936 | NM |

In Table 3, BK represents the video frame segment with the blocked abnormal property, SR represents the video frame segment with the sprayed abnormal property, and NM represents the normal video frame segment.

As shown in FIG. 10D, the sequence of video frame segment detection results of the 820th video frame is produced in the step S527 as follows: the sequence of video frame segment detection results={BK, BK, SR, SR, BK, SR, SR, SR, SR, SR, SR, SR, SR, SR, NM, NM}. According to the sequence of video, frame segment detection results, the total number of the blocked abnormal property (BK) is three, the total number of the video frame segment with the sprayed abnormal property (SR) is 11, and the total number of the normal video frame segment is two. Accordingly, it is to determine that the 760th video frame property is the sprayed abnormal property in the step S528 since the total number of the video frame segment with the sprayed abnormal property (SR) is greater than the total number of the video frame property with the blocked abnormal property (BK) according to the sequence of video frame segment detection results of the 820th video frame.

In an embodiment, when it is determined that the surveillance camera is abnormal, determining that the surveillance camera is abnormal with a particular one of the plurality of abnormal properties based on a total number of abnormal video frames with each of the plurality of abnormal properties. More specifically, when a total number of abnormal video frames with the particular one of the plurality of abnormal properties is more than a total number of abnormal video frames with any other one of the plurality of abnormal properties, it is to determine that the surveillance camera is abnormal with the particular one of the plurality of abnormal properties.

As exemplified by the video having 1800 video frames, it is assumed that the 1800 video frames involves 642 normal video frames, 26 video frames with the blocked abnormal property, and 1132 video frames with the sprayed abnormal property, including the three above-mentioned video frames (N=700, N=760, and N=820). In addition to the 642 normal video frames, the total number, which is equal to 1132, of the sprayed abnormal properties is the largest, and the percentage, which is equal to 62.89%, of the sprayed abnormal properties is the highest. Accordingly, it is determined that the surveillance camera is sprayed (i.e., the abnormality surveillance camera is abnormal with the sprayed abnormal property. In addition, it is also to define lower weighting factor to the 642 normal video frames so as to hardly dominate the abnormality results of the comparison, thus truly determining degrees and statuses of the abnormalities of the Nth abnormal property.

In an embodiment, the abnormal property of the video frame is determined according to the consecutive number of the abnormal property if the maximum number of any two abnormal properties is the identical. That is, the step of determining that the surveillance camera is abnormal with the particular one of the plurality of abnormal properties is further based on a maximum number of consecutive abnormal video frames with a same one of the plurality of abnormal properties for each of the plurality of abnormal properties.

For example, it is assumed that the total number, which is equal to 824, of the blocked abnormal property and the total number of the sprayed abnormal property are the identical. If the maximum number of consecutive abnormal video frames, which is equal to 714, with the blocked abnormal property is greater than the maximum number of consecutive abnormal video frames, which is equal to 325, with the sprayed abnormal property, it is determined that that the surveillance camera is blocked (i.e., the abnormality surveillance camera is abnormal with the blocked abnormal property.

In conclusion, the present disclosure has the following advantages:

1. By determining the sequence of video frame detection results with abnormal properties, the abnormalities, such as the blocked abnormality, the redirected abnormality, the sprayed abnormality, and the defocused abnormality of the surveillance camera could be accurately detected, thus facilitating a maintenance procedure to be performed on the surveillance camera to remove the particular one of the plurality of abnormal properties, and further shortening maintenance duration and improving maintenance quality of the surveillance camera.

2. The method of detecting abnormal statuses of the surveillance camera could be easily, resiliently, and adaptively transferred to other different surveillance camera systems.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A method of detecting whether a surveillance camera is normal or abnormal with one of a plurality of abnormal properties, comprising:
obtaining a plurality of video frames from a video captured by the surveillance camera;
sequentially comparing each video frame with a reference video frame to produce a sequence of video frame detection results, wherein each of the sequence of video frame detection results indicates that a corresponding video frame is a normal video frame or an abnormal video frame with one of the plurality of abnormal properties;
determining that the surveillance camera is normal when the sequence of video frame detection results indicates that all the plurality of video frames are normal video frames; otherwise determining that the surveillance camera is abnormal when the sequence of video frame detection results indicates that not all the plurality of video frames are normal video frames;
when it is determined that the surveillance camera is abnormal, determining that the surveillance camera is abnormal with a particular one of the plurality of abnormal properties based on a total number of the abnormal video frames with each of the plurality of abnormal properties;
issuing a maintenance notification of the surveillance camera when it is determined that the surveillance camera is abnormal with the particular one of the plurality of abnormal properties, thereby facilitating a maintenance procedure to be performed on the surveillance camera to remove the particular one of the plurality of abnormal properties;
wherein
the step of sequentially comparing each video frame with the reference video frame to produce the sequence of video frame detection results includes:
segmenting each video frame into a plurality of video frame segments of the video frame;
segmenting the reference video frame into a plurality of video frame segments of the reference video frame;
determining a blur level of each video frame segment of the video frame;
sequentially comparing each video frame segment of the video frame with a corresponding video frame segment of the reference video frame to produce a sequence of video frame segment detection results according to the blur level, wherein each video frame segment detection result indicates that the video frame segment is a normal video frame segment or an abnormal video frame segment with one of the plurality of abnormal properties;
determining that each video frame is a normal video frame when the sequence of video frame segment detection results indicates that all the plurality of video frame segments of the video frame have none of the plurality of abnormal properties; otherwise determining that the video frame is an abnormal video frame when the sequence of video frame segment detection results indicates that not all the plurality of video frame segments of the video frame have none of the plurality of abnormal properties;
when it is determined that the video frame is the abnormal video frame, determining that the video frame is the abnormal video frame with a particular one of the plurality of abnormal properties when a total number of the abnormal video frame segments of the video frame with the particular abnormal property is more than a total number of the abnormal video frame segments of the video frame with any other abnormal property; and
when the total number of the abnormal video frame segments of the video frame with the particular abnormal property is equal to a total number of the abnormal video frame segments with any of at least one of the plurality of abnormal properties different from the particular abnormal property, determining that the video frame is abnormal with the particular abnormal property when the total number of the abnormal video frame segments with the particular abnormal property is not less than a total number of the abnormal video frame segments with any of the plurality of abnormal properties other than the at least one of the plurality of abnormal properties and a maximum number of the abnormal video frame segments that are consecutive with the particular abnormal property is more than a maximum number of the abnormal video frame segments that are consecutive with each of the at least one of the plurality of abnormal properties.

2. The method of claim 1, wherein the step of determining that the surveillance camera is abnormal with the particular one of the plurality of abnormal properties includes:

determining that the surveillance camera is abnormal with the particular abnormal property when a total number of the abnormal video frames with the particular abnormal property is more than a total number of the abnormal video frames with any other abnormal property.

3. The method of claim 2, wherein the step of determining that the surveillance camera is abnormal with the particular abnormal property includes:

when the total number of the abnormal video frames with the particular abnormal property is equal to a total number of the abnormal video frames with any of at least one of the plurality of abnormal properties different from the particular abnormal property, determining that the surveillance camera is abnormal with the particular abnormal property when the total number of abnormal video frames with the particular one of the plurality of abnormal properties is not less than a total number of the abnormal video frames with any of the plurality of abnormal properties other than the at least one of the plurality of abnormal properties and a maximum number of the abnormal video frames that are consecutive with the particular abnormal property is more than a maximum number of the abnormal video frames that are consecutive with each of the at least one of the plurality of abnormal properties.

4. The method of claim 1, wherein the plurality of video frames are arranged in a time sequence order of the video captured by the surveillance camera.

5. The method of claim 1, wherein the plurality of abnormal properties include a blocked property, a redirected property, a sprayed property, and a defocused property.

6. The method of claim 3, wherein the plurality of abnormal properties include a blocked property, a redirected property, a sprayed property, and a defocused property.

7. The method of claim 6, wherein the blur level is determined as one of a high blur level, a medium blur level, and a low blur level.

8. The method of claim 7, wherein the step of sequentially comparing each video frame segment of the video frame with the corresponding video frame segment of the reference video frame further includes:

when it is determined that the corresponding video frame segment is at the low blur level, determining whether the corresponding video frame segment is a normal video frame segment, an abnormal video frame segment with the blocked property, or an abnormal video frame segment with the redirected property;

when it is determined that the corresponding video frame segment is at the medium blur level, determining whether the corresponding video frame segment is an abnormal video frame segment with the blocked property, or an abnormal video frame segment with the sprayed property, or an abnormal video frame segment with the defocused property; and when it is determined that the corresponding video frame segment is at the high blur level, determining whether the corresponding video frame segment is an abnormal video frame segment with the blocked property, or an abnormal video frame segment with the defocused property.

9. The method of claim 8, wherein the step of sequentially comparing each video frame segment of the video frame with the corresponding video frame segment of the reference video frame further includes:

after determining the blur level of the video frame segment and before determining whether the video frame segment is a normal video frame segment or an abnormal video frame segment, adjusting a brightness of the corresponding video frame segment based on a brightness of the corresponding video frame segment of the reference video frame.

10. The method of claim 2, wherein the plurality of abnormal properties include a blocked property, a redirected property, a sprayed property, and a defocused property.

11. The method of claim 10, wherein the blur level is determined as one of a high blur level, a medium blur level, and a low blur level.

12. The method of claim 11, wherein the step of sequentially comparing each video frame segment of the video frame with the corresponding video frame segment of the reference video frame further includes:

when it is determined that the corresponding video frame segment is at the low blur level, determining whether the corresponding video frame segment is a normal video frame segment, an abnormal video frame segment with the blocked property, or an abnormal video frame segment with the redirected property;

when it is determined that the corresponding video frame segment is at the medium blur level, determining whether the corresponding video frame segment is an abnormal video frame segment with the blocked property, or an abnormal video frame segment with the sprayed property, or an abnormal video frame segment with the defocused property; and when it is determined that the corresponding video frame segment is at the high blur level, determining whether the corresponding video frame segment is an abnormal video frame segment with the blocked property, or an abnormal video frame segment with the defocused property.

13. The method of claim 12, wherein the step of sequentially comparing each video frame segment of the video frame with the corresponding video frame segment of the reference video frame further includes:

after determining the blur level of the video frame segment and before determining whether the video frame segment is a normal video frame segment or an abnormal video frame segment, adjusting a brightness of the corresponding video frame segment based on a brightness of the corresponding video frame segment of the reference video frame.

14. The method of claim 5, wherein
the blur level is determined as one of a high blur level, a medium blur level, and a low blur level.

15. The method of claim 14, wherein the step of sequentially comparing each video frame segment of the video frame with the corresponding video frame segment of the reference video frame further includes:

when it is determined that the corresponding video frame segment is at the low blur level, determining whether the corresponding video frame segment is a normal video frame segment, an abnormal video frame segment with the blocked property, or an abnormal video frame segment with the redirected property;

when it is determined that the corresponding video frame segment is at the medium blur level, determining whether the corresponding video frame segment is an abnormal video frame segment with the blocked property, or an abnormal video frame segment with the sprayed property, or an abnormal video frame segment with the defocused property; and when it is determined that the corresponding video frame segment is at the high blur level, determining whether the corresponding video frame segment is an abnormal video frame segment with the blocked property, or an abnormal video frame segment with the defocused property.

16. The method of claim 15, wherein the step of sequentially comparing each video frame segment of the video frame with the corresponding video frame segment of the reference video frame further includes:

after determining the blur level of the video frame segment and before determining whether the video frame segment is a normal video frame segment or an abnormal video frame segment, adjusting a brightness of the corresponding video frame segment based on a brightness of the corresponding video frame segment of the reference video frame.

* * * * *